United States Patent
Ullmann (12)

(10) Patent No.: US 6,883,024 B2
(45) Date of Patent: Apr. 19, 2005

(54) METHOD AND APPARATUS FOR DEFINING APPLICATION SCOPE AND FOR ENSURING FINITE GROWTH OF SCALED DISTRIBUTED APPLICATIONS

(75) Inventor: Lorin Evan Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 09/740,088

(22) Filed: Dec. 18, 2000

(65) Prior Publication Data

US 2002/0116483 A1 Aug. 22, 2002

(51) Int. Cl.$^7$ ............................................. G06F 15/177
(52) U.S. Cl. ....................... 709/220; 709/201; 709/223; 340/825
(58) Field of Search ................................ 709/201, 220, 709/223; 340/825

(56) References Cited

U.S. PATENT DOCUMENTS

| | | | |
|---|---|---|---|
| 4,965,882 A | 10/1990 | Barabash et al. | ............ 364/513 |
| 5,390,282 A | 2/1995 | Koza et al. | .................... 395/13 |
| 5,638,494 A | 6/1997 | Pinard et al. | .................. 395/60 |
| 5,704,041 A | 12/1997 | Allen et al. | ............ 395/200.15 |
| 5,758,077 A * | 5/1998 | Danahy et al. | ............. 709/201 |
| 5,832,487 A | 11/1998 | Olds et al. | ..................... 707/10 |
| 5,838,970 A | 11/1998 | Thomas | ....................... 395/683 |
| 5,918,018 A | 6/1999 | Gooderum et al. | ..... 395/200.55 |
| 5,948,055 A * | 9/1999 | Pulsipher et al. | ............ 709/202 |
| 6,718,361 B1 * | 4/2004 | Basani et al. | ................ 709/201 |

FOREIGN PATENT DOCUMENTS

WO PCTUS9700273 1/1997

OTHER PUBLICATIONS

Darrell D.E. Long and Jehan–Francois Paris. "Regeneration Protocols for Replicated Objects.", IEEE Comput. Soc. Press, Feb. 1989.
"Distributed Systems Concepts and Design" by G. Coulouris, et al, pp. 316–318, Addison–Wesley Publishers,Ltd., Essex, England (1994).
"Integrating communication and database services using intelligent internetwork gateways". By J.A. Davis, IEEE Comput. Soc. Press, 1987.
IBM TDB "Technique for Replicating Distributed Directiory Information" pp. 113–120 May 1991.

* cited by examiner

Primary Examiner—Fritz Fleming
Assistant Examiner—Eron J Sorrell
(74) Attorney, Agent, or Firm—Anne V. Dougherty; Jeffrey S. Labaw (57) ABSTRACT

A system and method for incorporating "Application Responsibility Scope" for each distributed application in a million device installation using network topology. A distributed discovery engine is first used to discover the physical network and to define the physical scope per distributed network device. Thereafter, the logical network is created based on the physical network topology. Using the logical network, the application responsibility scope is defined for each application. Once application responsibility scopes have been defined, that information can be used to determine in runtime if an application has access to a particular endpoint. In the instance of a self-replicating program, the scope can be used to define and limit the span of control of endpoints at which the application can replicate itself.

18 Claims, 7 Drawing Sheets

METHOD AND APPARATUS FOR DEFINING APPLICATION SCOPE AND FOR ENSURING FINITE GROWTH OF SCALED DISTRIBUTED APPLICATIONS

FIELD OF THE INVENTION

This invention relates to distributed computing systems and more particularly to a system and method for controlling the growth of data objects by self-replicating applications.

BACKGROUND OF THE INVENTION

Distributed data processing networks with thousands of nodes, or endpoints, are known in the prior art. The nodes can be geographically dispersed and the computing environment managed in a distributed manner with a plurality of computing locations running distributed kernels services (DKS). The managed environment can be logically separated into a series of loosely connected managed regions in which each region has its own management server for managing local resources. The management servers coordinate activities across the network and permit remote site management and operation. Local resources within one region can be exported for the use of other regions in a variety of manners.

Realistically, distributed networks can comprises millions of machines (each of which may have a plurality of endpoints) which are to be managed by thousands of control machines. The so-called control machines run Internet Protocol (IP) Driver Discovery/Monitor Scanners which poll the endpoints and gather and store status data, which is then made available to other machines and applications. Such a distributed networked system must be efficient or else the status communications alone will suffocate the network. A detailed discussion of distributed network services can be found in co-pending patent application, Ser. No. 09/738,307, filed Dec. 15, 2000, entitled "METHOD AND SYSTEM FOR MANAGEMENT OF RESOURCE LEASES IN AN APPLICATION FRAMEWORK SYSTEM", the teachings of which are herein incorporated by reference.

A network discovery engine for a distributed network comprises at least one IP driver. For vast networks, a plurality of distributed IP drivers are necessary, with each performing status and other communications for a subset of the network's resources. It is necessary to define a driver's scope in order to assure that status communications are not duplicative.

One of the types of communications which can clog a distributed network is the replication of data objects at a plurality of machines. While data object replication can facilitate local access to data when a distributed application is running, the proliferation of data objects can monopolize bandwidth and interfere with both local CPU speed and network efficiency. In the case of applications which the function is to continue to discover and grow more data objects, a configuration error can lead to tens of thousands of objects being needlessly created and wherein ownership for action of the created objects is compromised.

It is desirable, therefore, and an object of the present invention, to provide a system and method whereby the scope of ownership for actions in defined for a distributed network.

It is another object of the present invention to provide a system and method whereby replication of objects in a distributed network can be limited.

It is still another object of the present invention to provide a method for defining a span of control for self-replicating programs.

Yet another object of the present invention is to define the foregoing span of control using network topology.

SUMMARY OF THE INVENTION

The foregoing and other objectives are realized by the present invention which provides a system and method for incorporating "Application Responsibility Scope" for each distributed application in a million device installation using network topology. A distributed discovery engine is first used to discover the physical network and to define the physical scope per distributed network device. Thereafter, the logical network is created based an the physical network topology. Using the logical network, the application responsibility scope is defined for each application.

Once application responsibility scopes have been defined, that information can be used to determine in runtime if an application has access to a particular endpoint In the instance of a self-replicating program, the scope can be used to define and limit the span of control of endpoints at which the application can replicate itself.

BRIEF DESCRIPTION OF THE DRAWINGS

The invention will now be described in greater detail with specific reference to the appended drawings wherein.

DESCRIPTION OF THE PREFERRED EMBODIMENT

Figure 1:
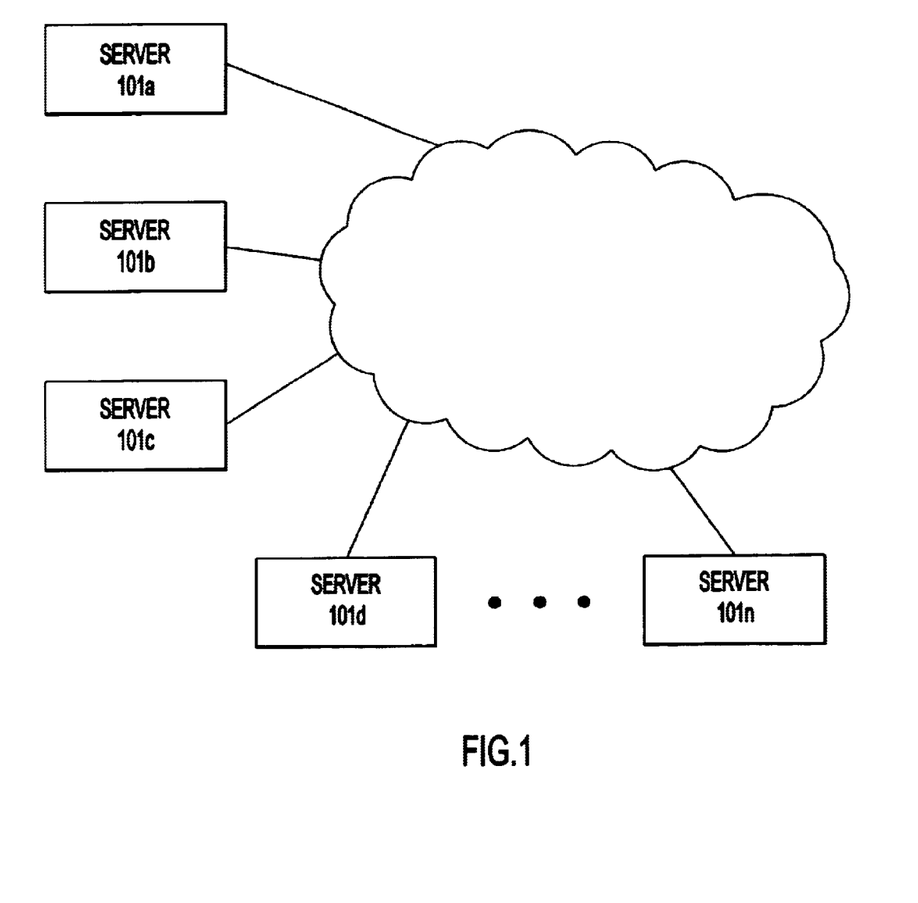
FIG. 1 provides a schematic representation of a distributed network in which the present invention may be implemented.

The present invention can be implemented in any network with multiple servers and a plurality of endpoints; and is particularly advantageous for vast networks having hundreds of thousands of endpoints and links therebetween. FIG. 1 provides a schematic illustration of a network for implementing the present invention. Among the plurality of servers (101a–101n as illustrated, at least one of the servers, 101a in FIG. 1, which already has distributed kernel services (DKS) is designated as one of the control servers for the purposes of implementing the invention. A network has many endpoints, with endpoint being defined, for example, as one Network Interface Card (NIC) with one MAC address, IP Address. The control server 101a in accordance with the present invention has the components illustrated in FIG. 2 in addition to the distributed kernel services, for providing a method including the steps of: defining the network topology and physical scope for network devices; creating a logical network using the physical network topology; and, defining, storing, and applying the logical scope (i.e., application responsibility scope) for each application to be run in the network.

Figure 2:
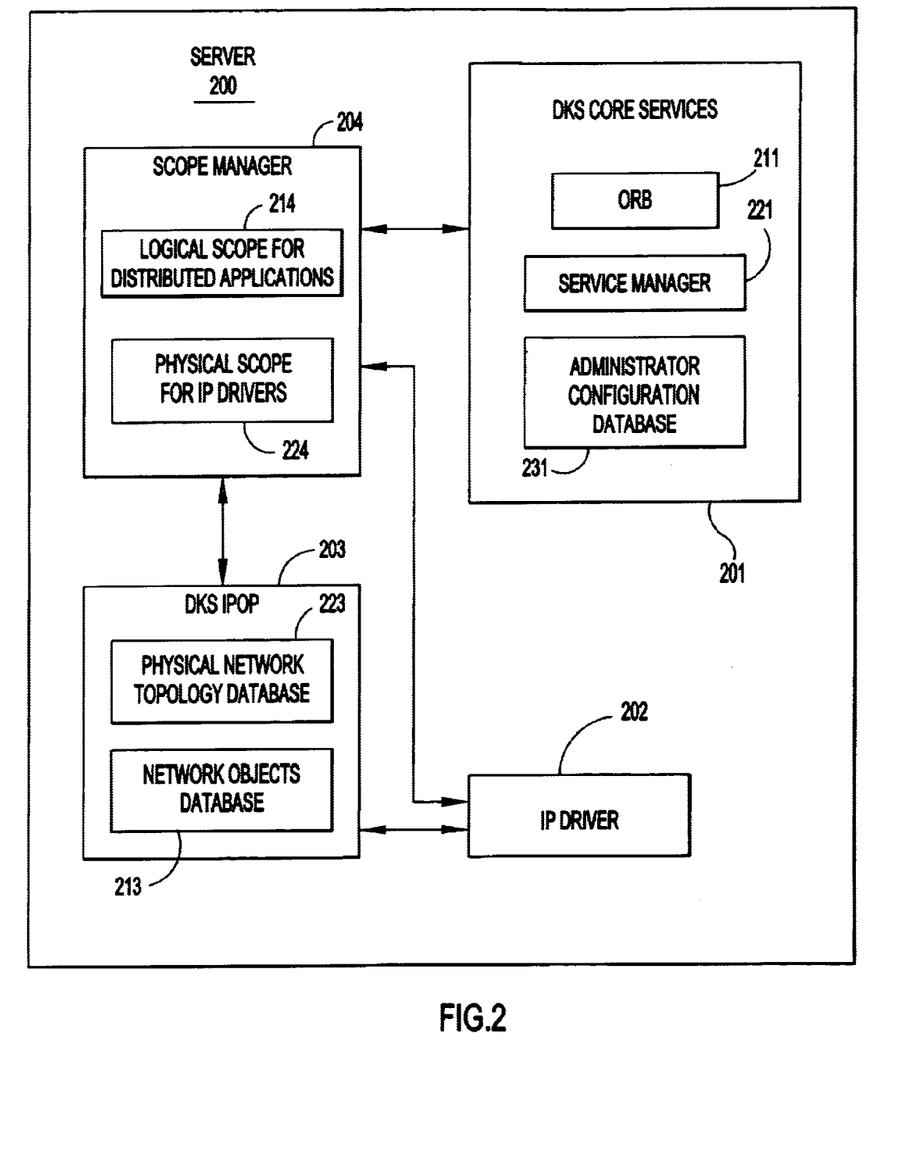
FIG. 2 provides a schematic representation of the server components which are used for implementing the present invention.

As shown in FIG. 2, the server 200 includes the already-available DKS core services at component 201, which services include the object request broker (ORB) 211, service manager 221, and the Administrator Configuration Database 231, among other standard DKS services. The DKS Internet Protocol Object Persistence (IPOP) Manager 203 provides the functionality for gathering network data, as is detailed in the co-pending patent application entitled "METHOD AND SYSTEM FOR MANAGEMENT OF RESOURCE LEASES IN AN APPLICATION FRAMEWORK SYSTEM", Ser. No. 09/738,307, filed Dec. 15, 2000, the teachings of which are incorporated by reference herein and as further detailed below with reference to the detailed IPOP Driver of FIG. 3 and the flow chart of FIG. 4.

In accordance with the functionality of the DKS IPOP, endpoint data are gathered for use by the DKS Scope Manager 204, the functions of which are further detailed below. A Network Objects database 213 is provided at the DKS IPOP Manager 203 for storing the information which has been gathered. The DKS IPOP also includes a Physical Network Topology Database 223. The Physical Network Topology Database will receive input from another existing service of the DKS which is the topology polling engine. The topology polling engine comprises a distributed polling engine made up of a plurality of IP Drivers, such as 202 which is provided to discover the physical network as a service of DKS. The topology engine discovers the endpoints, the links between endpoints, and the routes comprising a plurality of links, and provides the topology map. While storage of topology data had been available in the past, the illustrated system includes the storage at the DKS IPOP 203 purely for simplicity of description, although clearly existing storage can be accessed for use by the present invention. Clearly the location of the physical storage is not critical to the functionality of the inventive process, provided that the information is made available for use by the Scope Manager 204.

The system administrator uses the topology maps, along with distributed application information to arrive at Application Responsibility Scopes (ARSs) for each of the applications based on the network topology. The ARSs, also known as the logical scope for distributed applications, and the Physical Network Scopes for all IP Drivers are also stored at the Scope Manager 204 in storage locations 214 and 224 respectively for later use as described below with reference to FIG. 6. It is to be noted that the scopes, both application and physical scopes, are used by entities other than the Scope Manager. Specifically, applications use the application scope based on the logical network to define which endpoints with which to interact. A distributed IP Driver uses a scope based on the physical network to determine the endpoints for which it has responsibility.

Figure 3:
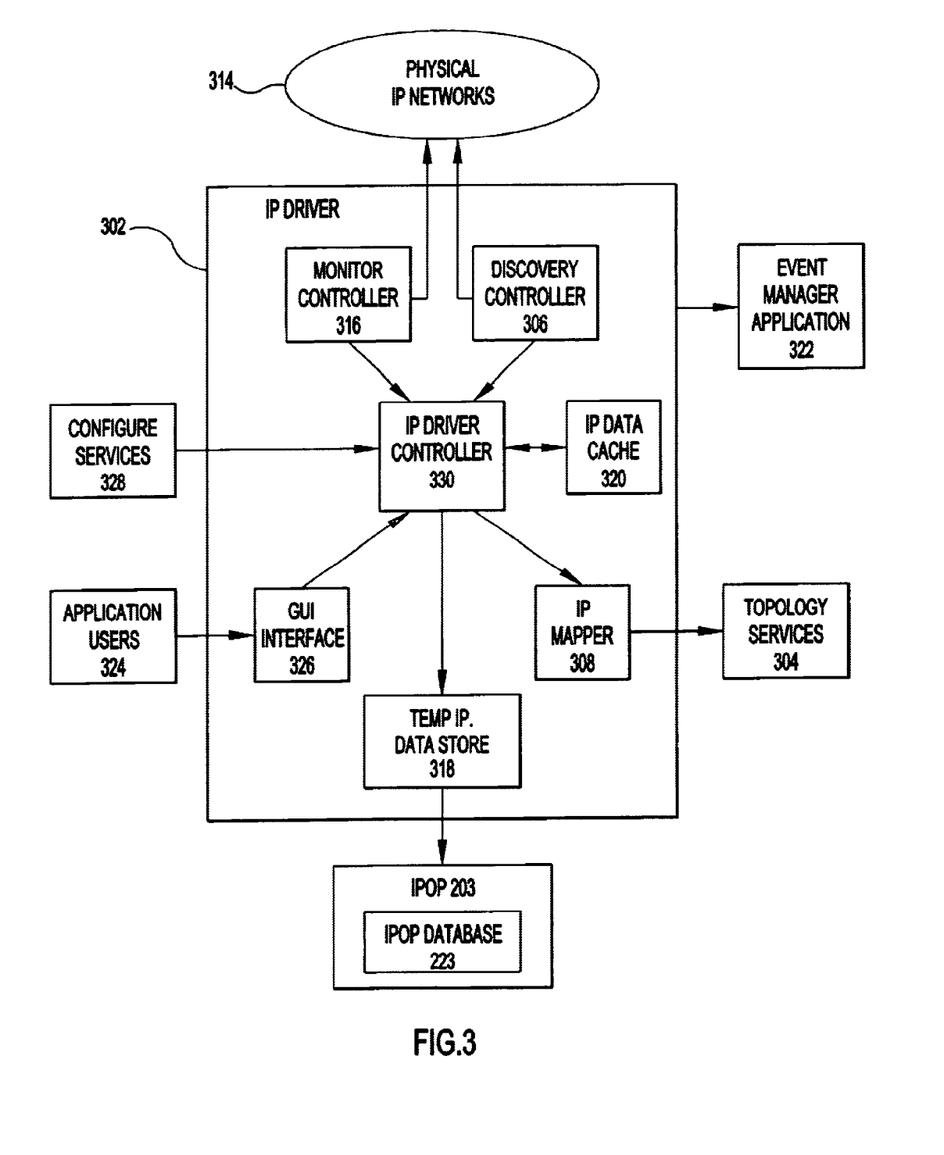
FIG. 3 provides a block diagram showing the IPOP service of FIG. 2 in greater detail.

As a first step to achieving the stated ends of the present invention, the physical scope of each of a plurality of IP drivers must be defined based on the network topology. As depicted in FIG. 3, the distributed Internet Protocol (IP) Driver Subsystem 300 contains a plurality of components, including one or more IP drivers 302 (202 of FIG. 2). Every IP driver manages its own "scope", described in greater detail below. Each IP driver is assigned to a topology manager within Topology Service 304, which can serve more than one IP driver. Topology Service 304 stores topology information obtained from discovery controller 306. A copy of the topology information may additionally be stored at each local server DKS IPOP (see: storage location 223 of DKS IPOP 203 in FIG. 2 for maintaining attributes of discovered IP objects). The information stored within the Topology Server may include graphs, arcs, and the relationships between nodes as determined by IP Mapper 308. Users can be provided with a GUI (not shown) to navigate the topology, which can be stored within a database at the Topology Service 304.

Discovery controller 306 detects IP objects in Physical IP networks 314 and monitor controller 316 monitors the IP objects. A persistent repository, such as IPOP database 223, is updated to contain information about the discovered and monitored IP objects. The IP driver 302 may use temporary IP data storage component 318 and IP data cache component 320, as necessary, for caching IP objects or for storing IP objects in persistent repository 223, respectively. As discovery controller 306 and monitor controller 316 perform detection and monitoring functions, events can be written to network event manager application 322 to alert network administrators of certain occurrences within the network, such as the discovery of duplicate IP addresses or invalid network masks.

External applications/users 324 can be other users, such as network administrators at management consoles, or applications that use IP driver GUI interfaces 326 to configure IP driver 302, manage/unmanage IP objects, and manipulate objects in the persistent repository 223. Configuration services 328 provide configuration information to IP driver 302. IP driver controller 330 serves as the central control of all other IP driver components.

A network discovery engine is a distributed collection of IP drivers that are used to ensure that operations on IP objects by gateways can scale to a large installation and can provide fault-tolerant operation with dynamic start/stop or reconfiguration of each IP driver. The IPOP Service manages discovered IP objects. To do so, the IPOP Service uses a distributed system of IPOP 203 with IPOP databases 223 in order to efficiently service query requests by a gateway to determine routing, identity, or a variety of details about an endpoint. The IPOP Service also services queries by the Topology Service in order to display a physical network or map to a logical network, which may be a subnet (or a supernet) of a physical network that is defined programmatically by the Scope Manager, as detailed below. IPOP fault tolerance is also achieved by distribution of IPOP data and the IPOP Service among many endpoint Object Request Brokers (ORBs).

One or more IP drivers can be deployed to provide distribution of IP discovery and promote scalability of IP Driver subsystem services in large networks where a single IP driver subsystem is not sufficient to discover and monitor all IP objects. Each IP discovery driver performs discovery and monitoring on a collection of IP resources within the driver's "physical scope". A driver's physical scope is the set of IP subnets for which the driver is responsible to perform discovery and monitoring. Network administrators generally partition their networks into as many physical scopes as are needed to provide distributed discovery and satisfactory performance.

A potential risk exists if the scope of one driver overlaps the scope of another. Accurately defining unique and independent physical scopes is the function of the Scope Manager 204, the scope configuration tool which is provided to define and verify the uniqueness of scope definitions. Routers also pose a potential problem in that, while the networks serviced by the routers will be in different scopes, a convention needs to be established to specify to which network the router "belongs", thereby limiting the router itself to the scope of a single driver.

Some Internet Service Providers (ISPs) may have to manage private networks whose addresses may not be unique across the installation. In order to manage private networks properly, first the IP driver has to be installed inside the internal network in order to be able to discover and manage the network. Second, since the discovered IP addresses may not be unique across an entire installation that consists of multiple regions, a private network ID should be assigned to the private network addresses. Therefore, for example, the unique name of a subnet becomes "privateNetworkId\subnetAddress". Those customers that do not have duplicate network addresses can just ignore the private network ID since the default private network ID is optimally defined as 0.

Physical scope configuration is important to the proper operation of the IP drivers because IP drivers assume that there are no overlaps in the drivers' scopes. Since there should be no overlaps, every IP driver has complete control over the objects within its scope. A particular IP driver does not need to know anything about the other IP drivers because there is no synchronization of information between IP drivers. The Configuration Service 328 provides the services to allow the DKS component to store and retrieve configuration information for a variety of other services from anywhere in the networks. In particular, the physical scope configuration will be stored in the Configuration Services 328 so that IP drivers and other applications can access the information.

The ranges of addresses that a driver will discover and monitor are determined by associating a subnet address with a subnet mask and associating the resulting range of addresses with a subnet priority. An IP driver is a collection of such ranges of addresses, and the subnet priority is used to help decide the system address. A system can belong to two or more subnets, such as is commonly seen with a gateway. The system address is the address on one of the network interface cards (NICs) that is used to make SNMP queries. A user interface can be provided, such as an administrator console, to write scope information into the Configuration Service. System administrators do not need to provide this information at all, however, as the IP drivers can use default values.

An IP driver gets its physical scope configuration information from the Configuration Service 328. The system administrator defines the scopes per distributed IP driver and stores that information at the Configuration Services for use by the IP Drivers and the Scope Managers. The scope of the physical network is used by the IP Driver in order to decide whether or not to add an endpoint to its topology. If the endpoint is out of scope, then the endpoint is not added to its topology which implies that another IP Driver scope may encompasses this endpoint. The physical scope configuration information may be stored using the following format:

ScopeID=driverID,anchorname,subnetAddress:subnetMask[:privateNetworkID:privateNetworkName:subnetPriority][, SubnetAddress:subnetMask:privateNetworkID:privateNetworkName:subnetPriority]]

Typically, one IP driver manages one scope. Hence, the "scopeID" and "driverID" would be the same. However, the configuration can provide for more than one scope managed by the same driver. "Anchorname" is the file descriptor, or textual description of a network entity which describes the network location using a hierarchical tree, into which the Topology Service will put the IP network objects.

A scope does not have to include an actual subnet configured in the network. Instead, users/administrators can group subnets into a single, logical scope by applying a bigger subnet mask to the network address. For example, if a system has subnet "147.0.0.0" with mask of "255.255.0.0" and subnet "147.1.0.0" with a subnet mask of "255.255.0.0", the subnets can be grouped into a single scope by applying a mask of "255.254.0.0". Assume that the following table is the scope of IP Driver 2.

| Subnet Address | Subnet mask |
|---|---|
| 147.0.0.0 | 255.255.0.0 |
| 147.1.0.0 | 255.255.0.0 |
| 146.100.0.0 | 255.255.0.0 |
| 69.0.0.0 | 255.0.0.0 |

The scope configuration for IP Driver 2 from the Configuration Service would be:

2=2,ip,147.0.0.0:255.254.0.0,146.100.0.0:255.255.0.0, 69.0.0.0:255.0.0.0.

In general, an IP system is associated with a single IP address, and the "scoping process" is a straightforward association of a driver's ID with the system's IP address.

Routers and multi-homed systems, however, can complicate the discovery process and monitoring process because theses devices may contain interfaces that are associated with different subnets. If all subnets of routers and multi-homed systems are in the scope of the same driver, the IP driver will manage the whole system. However, if the subnets of routers and multi-homed systems are across the scopes of different drivers, a convention is needed to determine a dominant interface to assure the following: that the IP driver that manages the dominant interface will manage the router object so that the router is not being detected and monitored by multiple drivers; that each interface is still managed by the IP driver determined by its scope; that the IP address of the dominant interface will be assigned as the system address of the router or multi-homed system; and, that the smallest (lowest) IP address of any interface on the router will determine which driver includes the router object within its physical scope.

Users can customize the configuration by using the subnet priority in the physical scope configuration. The subnet priority will be used to determine the dominant interface before using the lowest IP address. If the subnet priorities are the same, the lowest IP address is then used. Since the default subnet priority would be "0", then the lowest IP address would be used by default.

Figure 4:
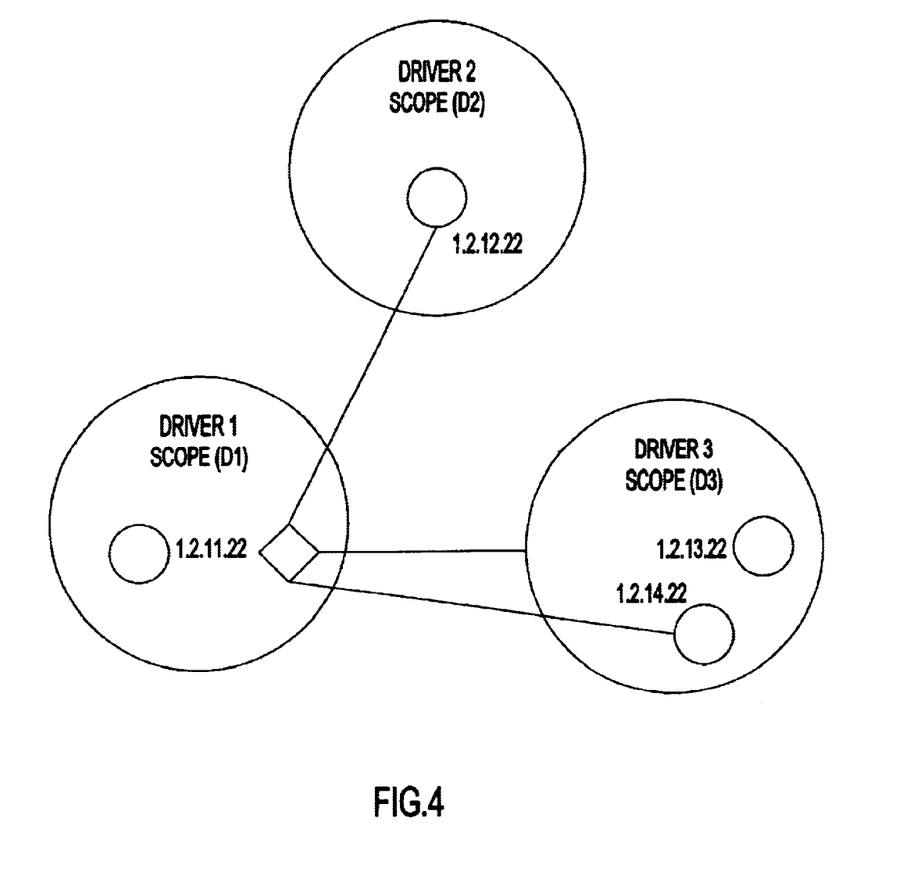
FIG. 4 is a schematic network diagram depicting a network with a router that undergoes a scoping process.

With reference now to FIG. 4, a network diagram depicts a network with a router that undergoes a scoping process. IP driver D1 will include the router in its scope because the subnet associated with that router interface is lower than the other three subnet addresses. However, each driver will still manage those interfaces inside the router in its scope. Drivers D2 and D3 will monitor the devices within their respective subnets, but only driver D1 will store information about the router itself in the IPOP database and the Topology Services database.

If driver D1's entire subnet is removed from the router, driver D2 will become the new owner of the router. Because there is no synchronization of information between the drivers, the drivers will self-correct over time as they periodically rediscover their resources. When the old driver discovers that it no longer owns the router, it deletes the router's information from the database. When the new driver discovers the router's lowest subnet address is now within its scope, the new driver takes ownership of the router and updates the various databases with the router's information. If the new driver discovers the change before the old driver has deleted the object, then the router object may be briefly represented twice until the old owner deletes the original representation.

There are two kinds of associations between IP objects. One is "IP endpoint in IP system" and the other is "IP endpoint in IP network". The implementation of associations relies on the fact that an IP endpoint has the object IDs (OIDs) of the IP system and the IP network in which it is located. A network and all its IP endpoints will always be assigned in the same scope. However, a router may be assigned to an IP Driver, but some of its interfaces may be assigned to different IP drivers. The IP drivers that do not manage the router, but manage some of its interfaces, will have to create interfaces but not the router object. Since those IP drivers do not have a router object ID to assign to its managed interfaces, they will assign a unique system name instead of an object ID in the IP endpoint object to provide a link to the system object in a different driver.

Because of the inter-scope association, when the IPOP is queried to find all the IP endpoints in a system, it will have to search not only IP endpoints with the system ID, but also IP endpoints with its system name. If a distributed IP Persistence (IPOP) Service is implemented, the IP Persistence Service has to provide extra information for searching among IP Persistence services.

Figure 5:
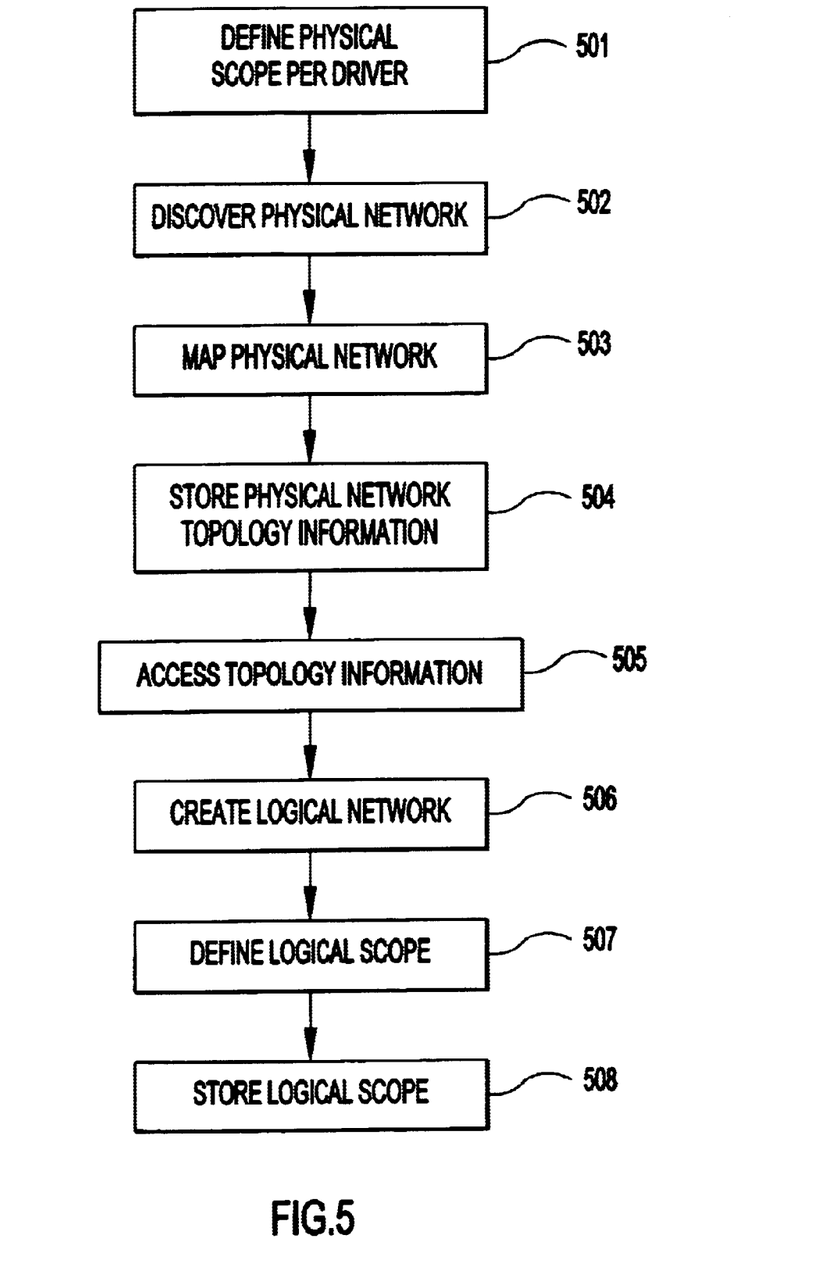
FIG. 5 is a flowchart depicting a process for defining the application responsibility scope for an application in accordance with the present invention.

The foregoing description provides the components which are necessary for discovering the physical network using the distributed polling engine. At step 501, the System Administrator defines the physical scope for each IP Driver in the distributed network. Once the scope for each IP Driver as part of the distributed polling engine has been defined, the IP Drivers are able to scan/poll to discover the physical network at 502. After all scanning/polling has been completed, the physical network is mapped into a graphical representation or network topology at step 503 by the IP Driver Mapper 308 which is then stored at step 504.

Assuming that the physical network topology has been discovered, mapped, and stored at the Physical Network Topology Database 223 at the DKS IPOP 203, the information will be utilized to proceed with the definition of the applications' scopes. At 505, the network topology information is accessed. Once the physical topology information is available, the administrator creates a logical network at step 506 by segmenting the physical network into a plurality of logical networks or, more likely, creating a logical network by the combination of physical networks rather than the segmenting of a physical network into smaller components. For each application, the logical scope is defined at step 507, first based on the logical network and then based on the physical network. The logical paths are defined for the application based on the logical network, and then the logical paths are aligned to the physical networks to define the physical endpoints located within the application's scope, and that information is stored at storage location 224 in step 508. An example of the logical scope for an application follows:

LogicalNetworkScopeID=AppID,PhysicalScopeID[PhysicalScopeID1, . . . PhysicalScopeIDn]

It is to be noted that the logical scope can be defined by the system administrator or a suggested scope can be defined by the Scope Manager based on the identity of the customer or on the location contained in anchorname. Furthermore a default logical scope can be defined as "all physical networks".

Figure 6:
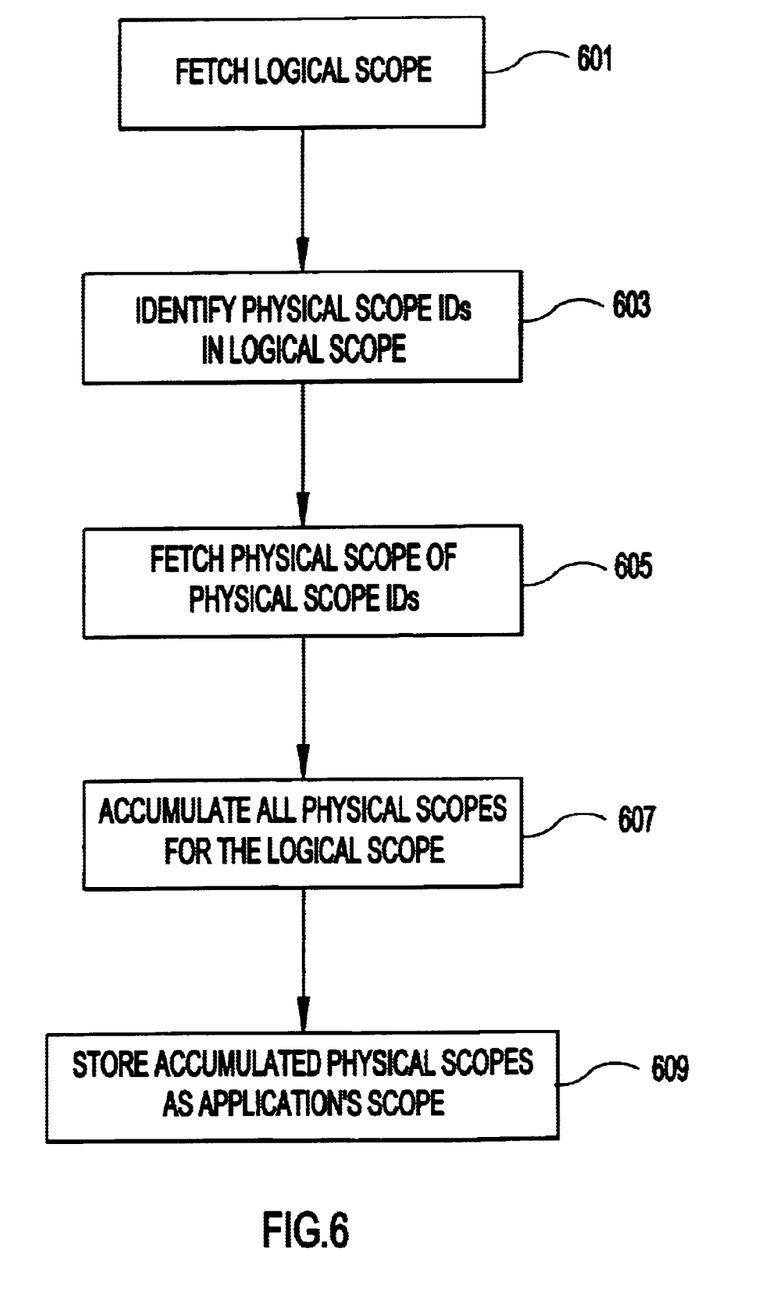
FIG. 6 is a flowchart depicting a process for utilizing the application responsibility scope during runtime.

Once the logical scope has been defined for an application, the Scope Manager can utilize that logical scope to determine, during runtime, if an application has access to a particular endpoint in response to a runtime request. FIG. 6 depicts the process flow for the Scope Manager to make use of the stored scope data during runtime to define applications which can run in each logical network. For each application, the Scope Manager fetches the logical scope at 601. Thereafter, for each PhysicalScopeID which is found in the logical scope, the Scope Manager identifies the physical component (i.e., by PhysicalScopeID) at 603, fetches the physical scope at 605, accumulates the physical scopes for all PhysicalScopeIDs which are found in the logical scope at 607, and stores the physical scope for each application at 609. The accumulated physical scopes comprise the application's network. Once the application's network is arrived at, the application can be provided with the information so that it "knows" with which endpoints it may interact.

The resulting application network (or application scope), which is arrived at by the foregoing process, can be utilized to limit the application's reach within the network. As mentioned above, if the configuration information does not include some definition for limiting an application's reach, then those applications which are designed to create objects at remote locations will propagate objects continuously, leading to network communications interference as well as to control concerns regarding which applications and which IP Drivers control the endpoints. By implementing the foregoing process to define an application's scope, or its span of control, then that application cannot engage in self-replication at any sites which are beyond its defined application scope. The network process for implementing a method for limiting the proliferation of self-replicating or cloning programs is set forth in FIG. 7.

Figure 7:
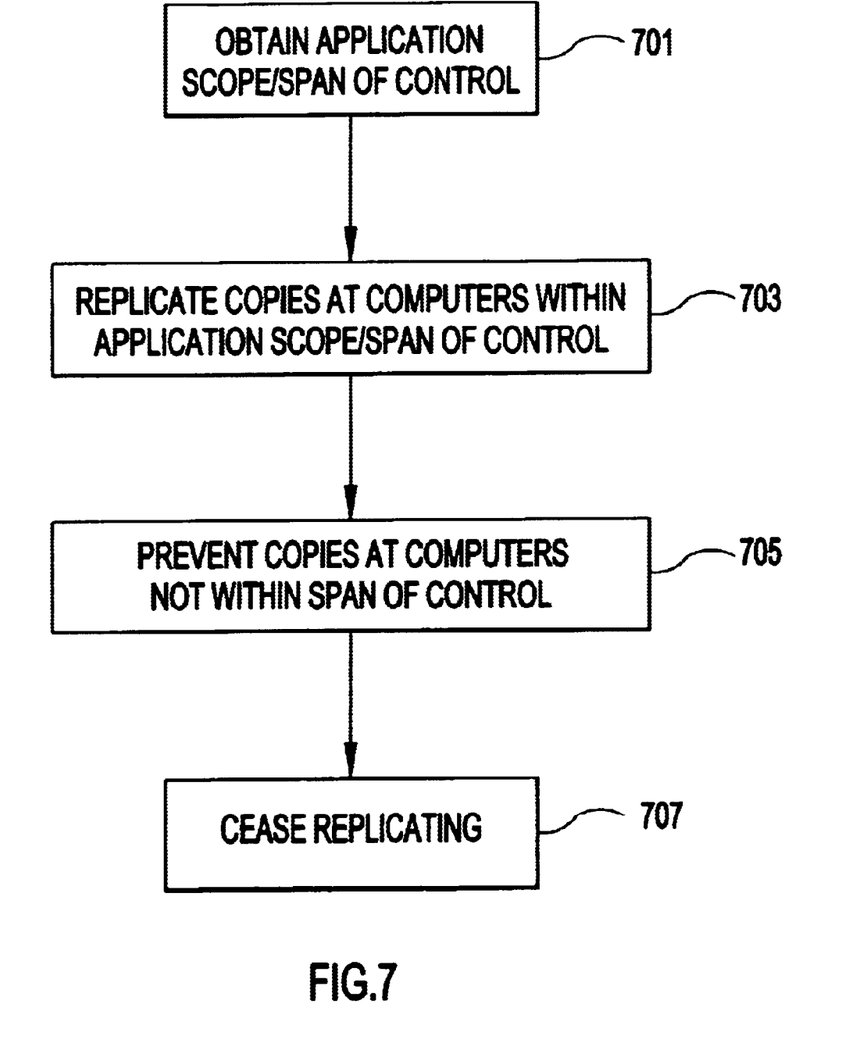
FIG. 7 is a flowchart depicting the network process for implementing a method for limiting the proliferation of self-replicating or cloning programs in accordance with the present invention.

At step 701, an application scope or span of control is obtained for the given application. Step 701 comprises executing the process flow of FIG. 6, or, if the processing has already been completed and the results stored, simply retrieving the stored application scope for the application of interest. Once the application's span of control has been provided (at step 701), the method proceeds with replicating copies of the program to computers within the span of control (step 703); preventing replication at computers outside of the span of control (step 705); and ceasing replication when substantially all computers within the span of control have installed copies of the program (step 707). The replicating, preventing replication, and ceasing replication steps are typically application-based self-control functions, wherein the application stays within its own scope. It can, however, be implemented that a network control entity additionally monitors the activities of the application to ensure that the application does not exceed its span of control.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for defining the scope of an application in a distributed network environment having a plurality of networked computers with internet protocol (IP) drivers comprising the steps of:
  defining the physical scope for each of said IP Drivers in the distributed network;
  discovering the physical network by scanning with said IP drivers;
  mapping the physical network into a graphical network representation;
  creating a logical network comprising components of said mapped physical network by determining logical paths for said application based on the logical network and aligning the logical paths for said application to the mapped physical network; and
  defining the logical scope for said application based on the logical network and the mapped physical network, wherein said logical scope is defined by endpoints aligned to said logical paths.

2. The method of claim 1 further comprising limiting the application's interactions within the network based on the application's network wherein said application comprises a self-replicating program and wherein said limiting comprises the steps of:
  obtaining an application scope as the span of control for a given application;
  replicating copies of the program to computers within the span of control;
  preventing replication at computers outside of the span of control; and
  ceasing replication when all computers within the span of control have installed copies of the program.

3. A method for determining application access to at least one endpoint in a distributed network environment having a plurality of computers each with at least one endpoint, comprising the steps of:
  obtaining a logical scope for said application;
  for each physical entity found within the logical scope for said application, identifying the physical entity and obtaining the physical scope for said physical entity;
  accumulating the physical scopes for all physical entities which are found in the logical scope to define the application's network; and
  determining whether a given endpoint is within the defined application's network.

4. The method of claim 3 further comprising storing the defined application network for each application.

5. The method of claim 4 further comprising limiting the application's interactions within the network based on the application's network.

6. The method of claim 5 wherein said application comprises a self-replicating program and wherein said limiting comprises the steps of:
  obtaining an application scope as the span of control for a given application;
  replicating copies of the program to computers within the span of control;
  preventing replication at computers outside of the span of control; and
  ceasing replication when all computers within the span of control have installed copies of the program.

7. The method of claim 6 wherein said plurality of network computers include IP Drivers and wherein said obtaining the logical scope for each of said applications comprises the steps of:
  defining the physical scope for each of said IP Drivers in the distributed network;
  discovering the physical network by scanning with said IP drivers;
  mapping the physical network into a graphical network representation;
  creating a logical network comprising components of said mapped physical network; and
  defining the logical scope for each application based on the logical network and the mapped physical network.

8. The method of claim 3 wherein said plurality of network computers include IP Drivers and wherein said obtaining the logical scope for each of said applications comprises the steps of:
  defining the physical scope for each of said IP Drivers in the distributed network;
  discovering the physical network by scanning with said IP drivers;
  mapping the physical network into a graphical network representation;
  creating a logical network comprising components of said mapped physical network; and
  defining the logical scope for each application based on the logical network and the mapped physical network.

9. A control server for determining application access to endpoints in a distributed network comprising a plurality of computers each having at least one endpoint, comprising:
  at least one IP driver for controlling at least one of said endpoints;
  at least one storage location for storing at least the physical scope of control for each of said at least one IP driver and at least one application scope for each application to be run on the network; and
  a Scope Manager component for administering the scope for each of the at least one IP driver and the at least one application.

10. The server of claim 9 wherein said Scope Manager is adapted to define the at least one application scope for each application to be run on the network.

11. The server of claim 10 wherein said Scope Manager defines the scope of an application in a distributed network environment having a plurality of networked computers with internet protocol (IP) drivers by the steps of:
  defining the physical scope for each of said IP Drivers in the distributed network;
  receiving physical network information from said IP drivers based on scanning by said IP drivers;
  mapping the physical network into a graphical network representation;
  creating a logical network comprising components of said mapped physical network by determining logical paths for said application based on the logical network and aligning the logical paths for said application to the mapped physical network; and
  defining the logical scope for said application based on the logical network and the mapped physical network, wherein said logical scope includes only endpoints aligned to said logical paths.

12. A program storage device readable by machine tangibly embodying a program of instructions executable by the machine to perform method steps for defining the scope of an application in a distributed network environment having a plurality of networked computers with internet protocol (IP) drivers said method comprising the steps of:
  defining the physical scope for each of said IP Drivers in the distributed network;

discovering the physical network by scanning with said IP drivers;

mapping the physical network into a graphical network representation;

creating a logical network comprising components of said mapped physical network by determining logical paths for said application based on the logical network and aligning the local paths for said application to the mapped physical networks; and defining the logical scope for said application based on the logical network and the mapped physical network, wherein said logical scope is defined by endpoints aligned to said logical paths.

13. A program storage device readable by machine tangibly embodying a program of instructions executable by the machine to perform method steps for determining application access to at least one endpoint in a distributed network environment having a plurality of computers each with at least one endpoint, said method comprising the steps of:

obtaining a logical scope for said application;

for each physical entity found within the logical scope for said application, identifying the physical entity and obtaining the physical scope for said physical entity;

accumulating the physical scopes for all physical entities which are found in the logical scope to define the application's network; and determining whether a given endpoint is within the defined application's network.

14. The program storage device of claim 13 wherein said method further comprises storing the defined application network for each application.

15. The program storage device of claim 14 wherein said method further comprises limiting the application's interactions within the network based on the application's network.

16. The program storage device of claim 15 wherein said application comprises a self-replicating program and wherein said limiting method step further comprises the steps of:

obtaining an application scope as the span of control for a given application;

replicating copies of the program to computers within the span of control;

preventing replication at computers outside of the span of control; and ceasing replication when all computers within the span of control have installed copies of the program.

17. The program storage device of claim 13 wherein said plurality of network computers include IP Drivers and wherein said method step of obtaining the logical scope for each of said applications comprises the steps of:

defining the physical scope for each of said IP Drivers in the distributed network;

discovering the physical network by scanning with said IP drivers;

mapping the physical network into a graphical network representation;

creating a logical network comprising components of said mapped physical network; and defining the logical scope for each application based on the logical network and the mapped physical network.

18. The program storage device of claim 16 wherein said plurality of network computers include IP Drivers and wherein said method step of obtaining the logical scope for each of said applications comprises the steps of:

defining the physical scope for each of said IP Drivers in the distributed network;

discovering the physical network by scanning with said IP drivers;

mapping the physical network into a graphical network representation;

creating a logical network comprising components of said mapped physical network; and defining the logical scope for each application based on the logical network and the mapped physical network.

* * * * *